Aug. 18, 1959 R. A. EDWARDS 2,900,500

ELECTRONIC COUNTER AND SHIFT REGISTER

Filed Oct. 19, 1954 2 Sheets-Sheet 1

Inventor:
Robert A. Edwards,
by Claude A. Mott
His Attorney.

Aug. 18, 1959 R. A. EDWARDS 2,900,500

ELECTRONIC COUNTER AND SHIFT REGISTER

Filed Oct. 19, 1954 2 Sheets-Sheet 2

Inventor:
Robert A. Edwards,
by [signature]
His Attorney.

United States Patent Office 2,900,500

Patented Aug. 18, 1959

2,900,500

ELECTRONIC COUNTER AND SHIFT REGISTER

Robert A. Edwards, Little Falls, N.J., assignor to General Electric Company, a corporation of New York Application October 19, 1954, Serial No. 463,090

13 Claims. (Cl. 250—27)

This invention generally relates to electronic switching devices, and more particularly to such devices applicable for high speed binary counting and shifting for purposes of automatic control or computation.

Serially connected binary switching devices of this type generally comprise a plurality of double stability state circuits, commonly termed flip-flop circuits, connected in a series arrangement with each stage switchable in sequence after the preceding stage has been operated so that by injecting a continuous series of impulses to the input of the first stage, each succeeding stage is turned on and off in sequence in a geometric progression by a factor of 2. Commonly, such circuits also incorporate "shifting" means for simultaneously transferring the on-off condition of each stage to a succeeding or preceding stage upon the application of a shift pulse to all stages. Heretofore to prevent interference between the serial counting operation and shifting operation of said circuits, additional electron tubes, rectifiers or equivalent components have been employed as isolating members to decouple the shifting connections of the stages during serial counting operations and to couple such connections during shifting operations. However, such additional tubes and other components result in a more complex and hence more costly unit; and the increased number of electron tubes additionally increases the probability of failure. There exists a need, therefore, for a simpler and more reliable high speed serial switching and shifting circuit.

The present invention is directed toward providing such a multi-stage circuit for both serial counting operation and shifting, that both eliminates the isolating tubes and rectifiers heretofore employed without sacrificing speed of operation or reliability. In accordance with one embodiment of this invention, this circuit comprises a plurality of stages of multi-control element electron tubes or the like, each stage connected in a unique flip-flop circuit arrangement permitting each pair of tubes to independently function as combined flip-flop or counting elements, and in addition as shift control elements, both operations being performed without mutual interference.

It is accordingly one object of this invention to provide a new and improved combined high speed serial counter and shifting circuit that is both less complex and more reliable than prior devices.

Other objects and many attendant advantages of this invention will be more readily comprehended by those skilled in this art upon a detail consideration of the following specification taken in connection with the following drawings wherein.

Figure 1:
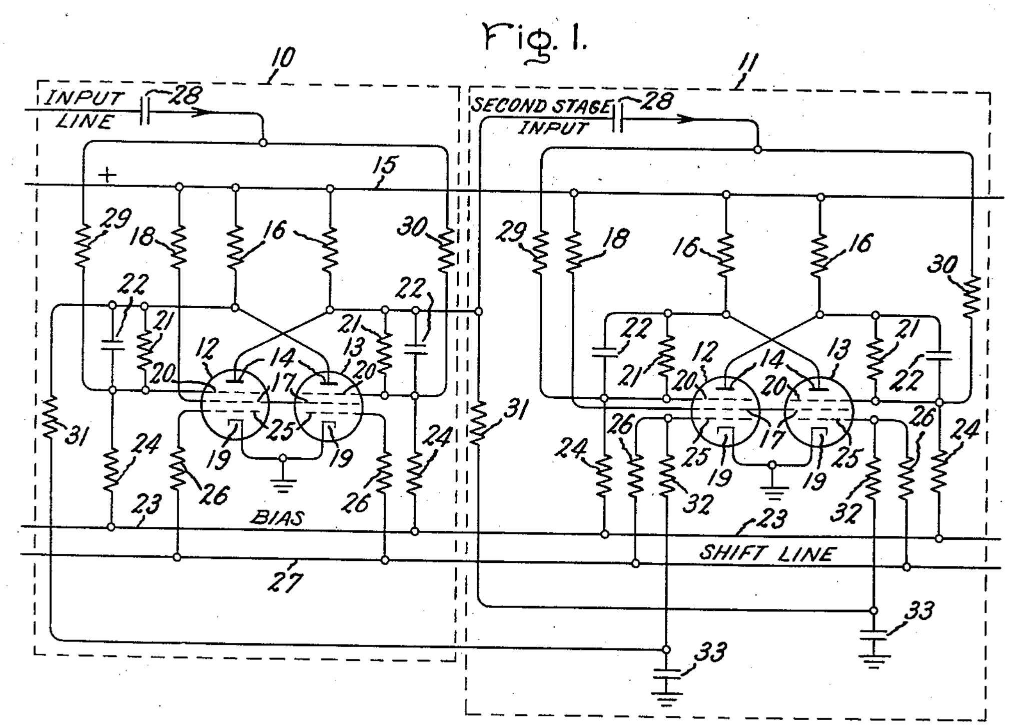
Fig. 1 is a schematic circuit diagram depicting two stages of one preferred embodiment of the invention.

Referring now to Fig. 1 for a detailed consideration of one preferred embodiment of the invention, wherein two stages are shown enclosed within dotted boxes numbered 10 and 11, each stage includes two multi-control element electron tubes 12 and 13, preferably pentode type tubes as shown, with the plate element 14 of each tube being energized by a source of positive voltage over line 15 through a resistor 16, the screen grids 17 of each tube being energized by said positive voltage through a common resistor 18 to establish the operating characteristics of the pentode tubes; and the cathode elements 19 being connected to ground. The tubes of each stage are interconnected in a double stability state, or flip-flop type connection, by connecting the plate element 14 of each tube to the suppressor grid 20 of the other through a reactance network, preferably including a resistor 21 in parallel with a capacitor 22; and by biasing the suppressor grid 20 by a source of voltage over line 23 through a resistor 24. The control grid 25 of each tube is connected by means of a resistor 26 to a common "shift" line 27, which for purposes of serial counting may be assumed to be at ground potential, as more fully discussed hereinafter. However, for an initial understanding of the serial or binary counting operation the control grid connections may be assumed to have no effect in the serial counting operation of the tubes.

With this type of circuit and assuming steady state conditions prevail, only one tube of each stage may be conducting at any given time while the other tube is cut off or non-conducting. This results from the fact that as one tube begins to conduct, a greater current passes through its plate resistor 16 lowering the voltage at the plate terminal 14 and consequently, lowering the positive potential reaching the suppressor grid 20 of the other tube. Lowering the potential of the suppressor grid results in lessening the current conduction through the second tube giving rise to an increased plate voltage at the plate element thereof, which in turn results in an increase of potential being directed backwardly to the suppressor grid of the other tube and a progressively increasing current flowing through this second tube. Hence, the ultimate result of initiating conduction through one tube is that this tube becomes fully conducting while the other tube is fully cut off. Now with one such tube conducting and the other cut off, should a negative pulse of relatively large amplitude be injected to the suppressor grids of both tubes simultaneously, such a pulse has no effect upon the tube that is non-conducting, whereas this large negative potential at the suppressor grid of the conducting tube results in this tube becoming non-conducting. Receiving such negative pulse therefore reverses the conducting condition of the tubes, and the tube that had been previously non-conducting becomes conducting and the tube previously conducting becomes non-conducting.

For conveying such a sharp-edged negative pulse to reverse the conducting condition of the tubes, each stage is supplied with a differentiating circuit, preferably including a capacitor 28 serially connected to a common terminal of two resistors 29 and 30 with the opposite terminal of each of these resistors being in turn connected to suppressor grid 20 of a different one of the two tubes of the stage to simultaneously convey each negative pulse thereto.

Figures 2, 3, 4, 5:
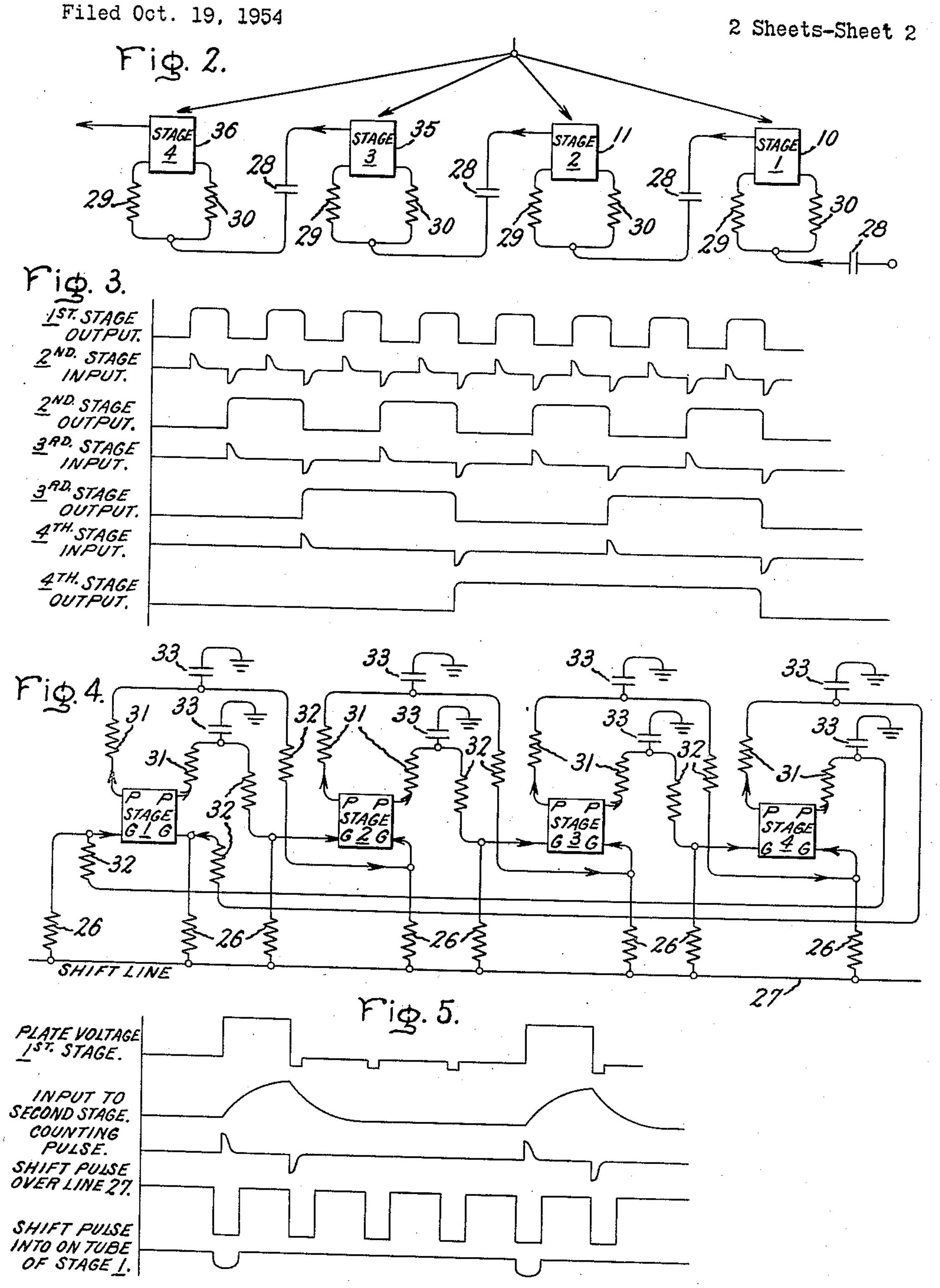
Fig. 2 is a partial block diagram more clearly illustrating the interconnection of the stages for counting operations.
Fig. 3 is a waveform time chart illustrating the operation of Fig. 2.
Fig. 4 is a partial block diagram similar to Fig. 2 depicting the interconnection of the stages for shifting operation.
Fig. 5 is a waveform time chart illustrating the operation of Fig. 4.

A plurality of these stages may therefore be interconnected in cascade as shown by Fig. 1, and more clearly by Fig. 2, by coupling the input of each capacitor 28 to one of the plates of the preceding stage and connecting the free terminals of the two resistors 29 and 30 to the suppressor grids of the succeeding stage. As shown, stage 10 is the input or first stage and stage 11 is the second stage having its input capacitor 28 connected to the plate of the left-hand tube of stage 10. With this type of interconnection, should the left-hand tube of the first stage 10 begin to conduct, the voltage appearing at the plate element 14 thereof immediately drops in potential transmitting a negative pulse to the input capacitor 28 of stage 11. This results in a sharp-edged negative pulse being directed to the suppressor grids 20 of stage 11 through resistors 29 and 30 resulting in this latter stage reversing its conducting condition in response thereto.

For serially counting a succession of pulses by a plurality of these counting stages in cascaded connection, a recurring pulse source (not shown) may be connected to energize the input capacitor 28 of the first stage, and the input capacitor of each succeeding stages may be connected to one of the plate circuits of a preceding stage as shown by the four concatenated stages 10, 11, 35, and 36 of Fig. 2. With this connection, the operation of this circuit is as depicted by the waveform diagram, Fig. 3, wherein the uppermost waveform depicts the output pulses from the first stage, the third waveform from the top depicts the output pulses from the second stage, the fifth waveform from the top depicts the output waveform of the third stage, the lowermost waveform depicts the output of the fourth stage; and the second, fourth, and sixth waveforms from the top illustrate the differentiated pulses entering the input of the second, third, and fourth stages. Observing these waveforms, it is noted that as the first stage is turned on (its output voltage increases from a lower to a higher value), a positive pulse is generated by the differentiating circuit to the input of the second stage (second waveform). This positive pulse as discussed above, has no effect on the operation of the second stage. However, when the first stage 10 is turned off and its output voltage drops from a higher to a lower value, the negative pulse generated by the differentiating circuit is injected into the second stage resulting in the second stage being turned on (the output voltage thereof rising from a more negative to a more positive value). Similarly, as the output of the second stage 11 is turned on and its voltage rises from a lower to a higher value, the positive pulse generated by the differentiating circuit has no effect on the third stage, whereas when the second stage is turned off and its output voltage drops from a more positive to a more negative value, the negative pulse generated by its output differentiating circuit results in the third stage being turned on. Thus, it is observed that each stage is turned on after the preceding stage has been turned on and off, and each of the individual stages are operated sequentially in geometric progression by a factor of 2 (the binary system).

*Shifting*

The process of shifting differs from serial counting in that all of the stages operate simultaneously rather than sequentially, each to transfer its on-off condition to a succeeding stage and at the same time to assume the on-off condition of the preceding stage. Referring again to Fig. 1 for an understanding of the manner by which these same stages may be operated to shift rather than serially count, interconnecting the control grids of both tubes of each stage with the plates of both tubes of a succeeding stage are two potential transposing circuits, each preferably including two series connected resistors 31 and 32, and a capacitor 33 in a T type network. The two series connected resistors 31 and 32 of this network directly connect each plate 14 of the tubes with a different control grid 25 of the tubes of a succeeding stage, thereby to transpose or prime these latter control grids with different potentials, one more positive than the other in accordance with the conducting or nonconducting condition of the tubes of the preceding stage. The control grids of each stage are also connected to a shift line 27 through resistors 26; and as discussed above when this shift line is deenergized, the control grids are maintained at substantially ground potential due to the low control grid cathode impedance of the tubes when these grids are at zero potential or slightly positive. Thus, in the absence of a shift signal over line 27, the transposed or priming potentials transmitted by the T networks from one stage to another exert no appreciable effect on the serial counting operation of the tubes and the serial counting and shifting operations therefore are independent. On the other hand, when a large negative pulse is injected over the shift line 27 to the control grids of all tubes, this negative pulse is coincidentally combined with the transposed potentials and since one of these transposed potentials is more positive than the other, one of the control grids in each stage is maintained at zero or at a slightly positive potential as before, but the other control grid is made negative. As a result, this negative shift pulse operates to turn "on" or "off" each stage in accordance with the on-off condition of the preceding stage, as reflected by the transposed potentials thereof.

The shifting operation and the interconnection of these stages for shifting is more clearly illustrated by Figs. 4 and 5; Fig. 4 illustrating a plurality of these stages in an endless ring connection and Fig. 5 illustrating the voltage waveforms during the shifting operation. As shown, the potentials at the plates (elements labeled P) of the first stage are directed to prime the control grids (elements labeled G) of the second stage by means of the T-type resistor capacitor networks 31, 32, 33; those of the second stage being directed to prime the control grids of the third stage through similar networks, and so forth; and finally those of the last stage being directed backwardly to the first stage to complete the ring or endless chain connection.

Assuming that all stages, with the exception of the fourth stage, are in their "zero" or "off" condition, and the fourth stage is in its "one" or "on" condition, then referring to Fig. 5, it is noted that the first negative shift pulse received over line 27 (the fourth waveform from the top) operates to shift this "on" condition of the fourth stage to the first stage, and the plate potential of the tube that had been formerly conducting in the first stage is made non-conducting and therefore rises in potential as shown by the uppermost waveform (labeled Plate Voltage 1st stage). Similarly, the fourth stage is simultaneously turned off (not shown), for it assumes the on-off condition of the third stage upon receiving the shift pulse. However, at the same time as the first stage receives the shift pulse over line 27, it also receives a carryover counting pulse from the fourth stage (as depicted in Fig. 5 by the third waveform from the top). Since the shift pulse has a greater negative value, as shown, and has a longer duration than the carryover pulse, the shifting operation takes precedence over any serial operation and any carryover counting pulses that may be generated from stage to stage during shifting operations have no effect. Continuing this analysis, stages 2 and 3 remain in their off condition upon receiving the first shift pulse since as discussed above the assumption was made that only the fourth stage was in its "on" condition and all other stages in their "off" condition resulting in the transfer from stage 1 to 2 of an "off" condition, leaving these stages in the same form as before.

The lowermost waveform of Fig. 5 portrays the resultant pulse reaching the "on" tube of the first stage after the shift pulse has been injected over line 27. This resultant pulse as discussed above is the coincident sum of the shift pulse over line 27 taken with the positive transposed potential from the more positive plate of stage 4 (the tube in the "on" condition).

To prevent more than one shift at a time, that is, to prevent stage 2 from assuming the on-off condition of stage 4 along with stage 1 after receiving the first shift pulse, the capacitors 33 included in the potential transposing circuits operate as time delay or integrating means to prevent too rapid a change in the plate potential from effecting the control grids of a second stage during transfer operations. As shown by the second curve of Fig. 5, when the "on" tube of the first stage becomes nonconducting in response to the shift pulse from the fourth stage, and its plate voltage accordingly rises (uppermost curve), this increased voltage is not immediately directed to prime the grid of the second stage, for if it were the same shift pulse that transfers the condition of stage 4 to stage 1 would also turn "on" stage 2 to its conducting condition. This time delay or integrater action of condenser 33, therefore, as shown by the second uppermost curve of Fig. 5, prevents the control grid of the second stage from being positively primed by the first stage until after a given time delay has elapsed; this time delay being determined by the minimum interval between the shift pulses over line 27 as shown by Fig. 5.

Upon the receipt of the second shift pulse over line 27 as depicted by the fourth curve of Fig. 5, the "on" condition of stage 1 is shifted to stage 2 in a manner similar to the shift discussed above, and the off condition of stage 4 is likewise transferred to turn off stage 1. Thus, upon the application of each shift pulse, the on-off condition of each stage is transferred to a succeeding stage, and this stage itself receives the condition of a stage preceding it.

Although the above disclosed embodiment of the invention has illustrated the various flip-flop stages as employing pentode vacuum tubes, it is, of course, contemplated that other multi-control element vacuum tubes, as well as other known multi-control on-off elements such as magnetic amplifiers, transistors, thermistors, relays, and the like may be employed in accordance with this teaching, since such elements have been successfully used heretofore in flip-flop circuit arrangements; and may in addition be provided with independent controlling means for shifting as taught by the present invention. Consequently, since this variation as well as other variations are suggestible by this invention to those skilled in the art, this invention is to be considered as limited only in accordance with the claims appended hereto.

What is claimed is:

1. A serial counter and shifting register comprising a plurality of cascaded stages, each including a pair of multi-grid electron tubes in flip-flop connection having the plate element of each tube connected to a first control grid of the other tube and having an additional control grid of each tube connected through an impedance to a common shift line, means interconnecting these stages for serial operation, said means including a differentiating circuit interconnecting one plate circuit of each stage with both first control grids of a succeeding stage, means for independently shifting the on-off condition of each stage to a different stage, said means including means for transposing the potential of each plate of one stage to energize a different one of the additional control grids of said different stage, and means for enabling the simultaneous energization of said common shift line with shift impulses, whereby the coincident combination of said transposed potentials and said shift impulses results in the on-off condition of each stage being transferred to an adjoining stage, and means for rendering said transposed potentials insensitive to rapid variation in the plate potential being transposed.

2. In a switching circuit, a plurality of cascaded binary counting stages, each stage including a pair of electron tubes, with each tube having a plate and a plurality of control grids, the plate of each tube of a stage being connected to one of the control grids of the other tube of said stage and an additional grid of each tube being connected to a common shift line, means interconnecting said stages for serial operation, and means for independently shifting a count standing in each stage to a different stage, said means including means for transposing the potential of each plate of a stage to energize a different one of said additional control grids of said different stage, and means for conducting shift impulses to said shift line, whereby the coincident combination of said transposed potential and said shift impulses results in the on-off condition of each stage being transferred to said different stage, and means for rendering said transposed potentials insensitive to rapid variation in the plate potential being transposed.

3. In a switching circuit, a plurality of cascaded stages, each stage including a pair of electron tubes, said tubes each having a plate and a plurality of control grids, the plate of each tube being connected to one of the grids of the other tube of said pair and an additional grid of each tube being connected to a common shift line, means interconnecting said stages for serial operation, and means for independently shifting the count standing in each stage to a different stage, said means including means for transposing the potential of each plate of a stage to energize a different one of said additional grids of said different stage, and means for conducting shift impulses to said shift line, whereby the coincident combination of said transposed potential and said shift impulses results in the on-off condition of each stage being transferred to said different stage, and means for rendering said transposed potentials insensitive to rapid variation in the plate potential being transposed, said latter means constituting an integrating circuit for transposing said potentials, said integrating circuit having a time constant directly related to the highest shifting rate desired.

4. A switching circuit comprising a plurality of pairs of multi-grid electron tubes, each having a plate, cathode, and a plurality of control grids, the tubes of each pair being interconnected in a double stability state circuit, means interconnecting said pairs in cascade, and additional means for shifting the stability state condition of each pair to a different pair, said means including an integrating circuit for transporting the potential of each plate of one pair to energize a different one of the control grids of the second pair, and means for simultaneously conducting shift impulses to said second grids of all tubes.

5. In a switching circuit, a plurality of flip-flop connected stages in concatenated arrangement, each stage having two cross connected on-off elements, the potentials of each of which vary dependent upon its on-off condition, and each element having two separate controlling means independently operable to turn the element from on to off, means interconnecting one of said controlling means of each element in said flip-flop arrangement and means for interconnecting said second controlling means for shifting, said shifting interconnection including means for transposing the potentials of both elements of each stage to prime different ones of the second controlling means of a different stage and means for conducting shift impulses to all said second controlling means in common, whereby the on-off condition of each stage is transferred to said different stage for each shifting impulse received independently of said concatenated arrangement of the stages.

6. In the switching circuit of claim 5, said means for transposing the potentials of both elements of each stage to prime different ones of the second controlling means of a different stage including a time delay circuit for rendering said transposed potentials insensitive to rapid variation and the plate potential being transposed.

7. In a switching circuit a plurality of pairs of pentode electron tubes having the plate element of each cross-connected to the suppressor grid of the other and double stability state arrangement, means including a plurality of differentiating circuits each interconnecting adjoining pairs of tubes in concatenated arrangement for serial operation, means for independently shifting the on-off condition of each pair to a different pair, said means including a time delay circuit transporting the potential of each plate element of one pair with a different one of the control grids of said different pair, and impedances interconnecting the control grids of all tubes in common for simultaneously receiving shift impulses.

8. In a switching circuit a plurality of cascaded binary counted stages, each stage including two pentode electron tubes having a plate, suppressor grid, and control grid, with the plate of one tube cross connected to the suppressor grid of a second tube in on-off double stability state arrangement, means for shifting the on-off condition of each stage to a different stage independently of the cascaded connection of the stages, said means including two time delay circuits for each stage, each circuit interconnecting the plate of a different tube of said stage with a different one of the control grids of said different stage, and a plurality of impedances interconnecting the control grids of the tubes of all stages in common for simultaneously receiving shift impulses.

9. In the circuit of claim 8, said time delay circuit comprising a resistance capacitance network.

10. In a switching circuit, a plurality of flip-flop connected stages in concatenated arrangement, each stage having two cross connected on-off elements, the potentials of each of which vary dependent upon its on-off condition, and each element having two separate controlling means separately operable to turn the element on or off, means interconnecting one of said controlling means of each element in said flip-flop arrangement and means for interconnecting said second controlling means for shifting, said shifting interconnection including means for transposing the potentials of both elements of each stage to prime different ones of the second controlling means of a different stage and means for conducting shift impulses to all said second controlling means in common, whereby the on-off condition of each stage is transferred to said different stage for each shifting impulse received independently of said concatenated arrangement of the stages.

11. In the switching circuit of claim 10, said means for transposing the potentials of both elements of each stage to prime different ones of the second controlling means of a different stage including a time delay circuit for rendering said transposed potentials insensitive to rapid variation of the element potential being transposed.

12. In a switching circuit, a plurality of flip-flop connected stages in concatenated arrangement, each stage having two cross connected on-off elements, the potentials of which vary dependent upon its on-off condition, and each element having two separate controlling means, means biasing each of said controlling means to enable each element to be turned off or on by either of said controlling means, means interconnecting one of said controlling means of each element in said flip-flop arrangement and means for interconnecting said second controlling means for shifting, said shifting interconnection including means for transposing the potentials of both elements of each stage to prime different ones of the second controlling means of a different stage and means for conducting shift impulses to all said second controlling means in common, whereby the on-off condition of each stage is transferred to said different stage for each shifting impulse received independently of said concatenated arrangement of the stages.

13. In the switching circuit of claim 12, said means for transposing the potentials of both elements of each stage to prime different ones of the second controlling means of a different stage including a time delay circuit for rendering said transposed potentials insensitive to rapid variation of the element potential being transposed.

References Cited in the file of this patent

UNITED STATES PATENTS

| | | |
|---|---|---|
| 2,706,811 | Steele | Apr. 19, 1955 |
| 2,781,447 | Lester | Feb. 12, 1957 |
| 2,782,305 | Havens et al. | Feb. 19, 1957 |
| 2,785,304 | Bruce et al. | Mar. 12, 1957 |
| 2,787,416 | Hansen | Apr. 2, 1957 |

UNITED STATES PATENT OFFICE

CERTIFICATE OF CORRECTION

Patent No. 2,900,500 August 18, 1959

Robert A. Edwards

It is hereby certified that error appears in the printed specification of the above numbered patent requiring correction and that the said Letters Patent should read as corrected below.

Column 6, line 39, for "transporting" read -- transposing--

Signed and sealed this 10th day of January 1961.

(SEAL)

Attest:

KARL H. AXLINE
Attesting Officer

ROBERT C. WATSON
Commissioner of Patents